United States Patent [19]

Dobler et al.

[11] Patent Number: 5,056,016

[45] Date of Patent: Oct. 8, 1991

[54] DEVICE FOR DETERMINING GEOMETRIC PARAMETERS OF A STRUCTURAL ELEMENT

[75] Inventors: Klaus Dobler, Gerlingen; Hansjoerg Hachtel, Weissach, both of Fed. Rep. of Germany

[73] Assignee: Robert Bosch GmbH, Stuttgart, Fed. Rep. of Germany

[21] Appl. No.: 462,798

[22] Filed: Jan. 10, 1990

[30] Foreign Application Priority Data

Feb. 24, 1989 [DE] Fed. Rep. of Germany ... 8902231[U]

[51] Int. Cl.$^5$ ............... G01R 33/12; G01N 27/82; G01B 7/28; B07C 5/00
[52] U.S. Cl. .................... 324/232; 209/546; 324/226; 324/227; 324/234; 324/238
[58] Field of Search ................ 324/229–232, 324/234, 236–243; 209/546, 549, 562, 567

[56] References Cited

U.S. PATENT DOCUMENTS

| | | | |
|---|---|---|---|
| 2,537,731 | 1/1951 | Angell | 324/229 |
| 3,392,829 | 7/1968 | Keinanen | 324/243 X |
| 3,539,006 | 11/1970 | Hanna et al. | 324/238 X |
| 3,870,948 | 3/1975 | Holt et al. | 324/236 |
| 3,883,796 | 5/1975 | Holt et al. | 324/236 |

FOREIGN PATENT DOCUMENTS

| | | |
|---|---|---|
| 0283650 | 9/1988 | European Pat. Off. . |
| 1113647 | 5/1989 | Japan ............... 324/237 |

*Primary Examiner*—Gerard R. Strecker
*Attorney, Agent, or Firm*—Michael J. Striker

[57] ABSTRACT

A measuring device for contactless control of a design of structural elements composed of an electrically conductive material comprises at least one coil through which an alternating current flows and whose measuring voltage is influenced by a structural element, and electronic evaluating unit arranged to compare the measuring voltage of the coil influenced by the structural element with a nominal value, the coil being formed as a cylindrical coil.

3 Claims, 1 Drawing Sheet

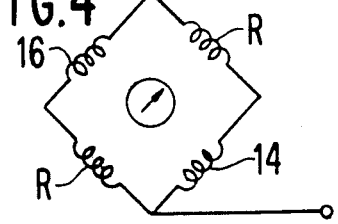
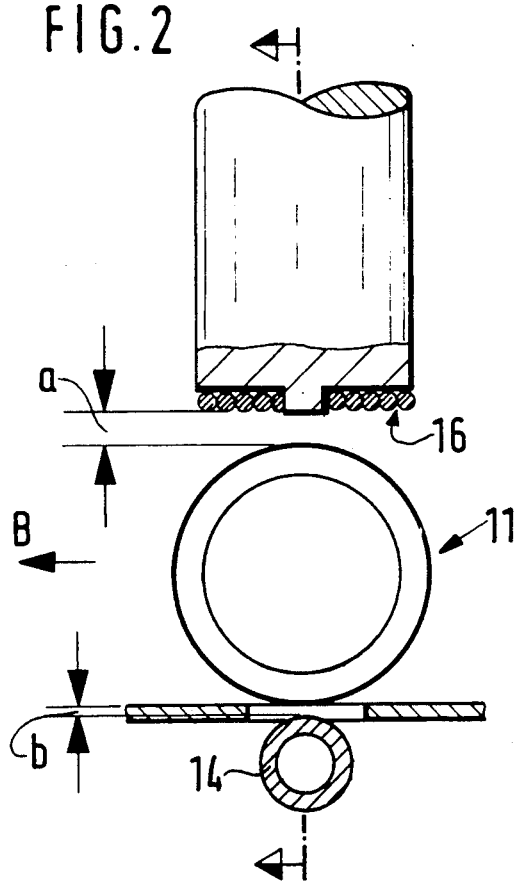
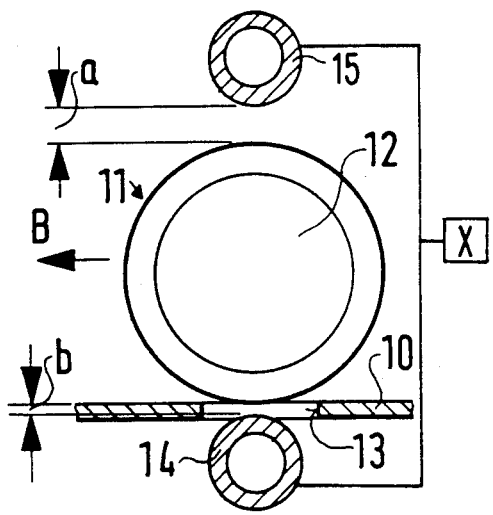
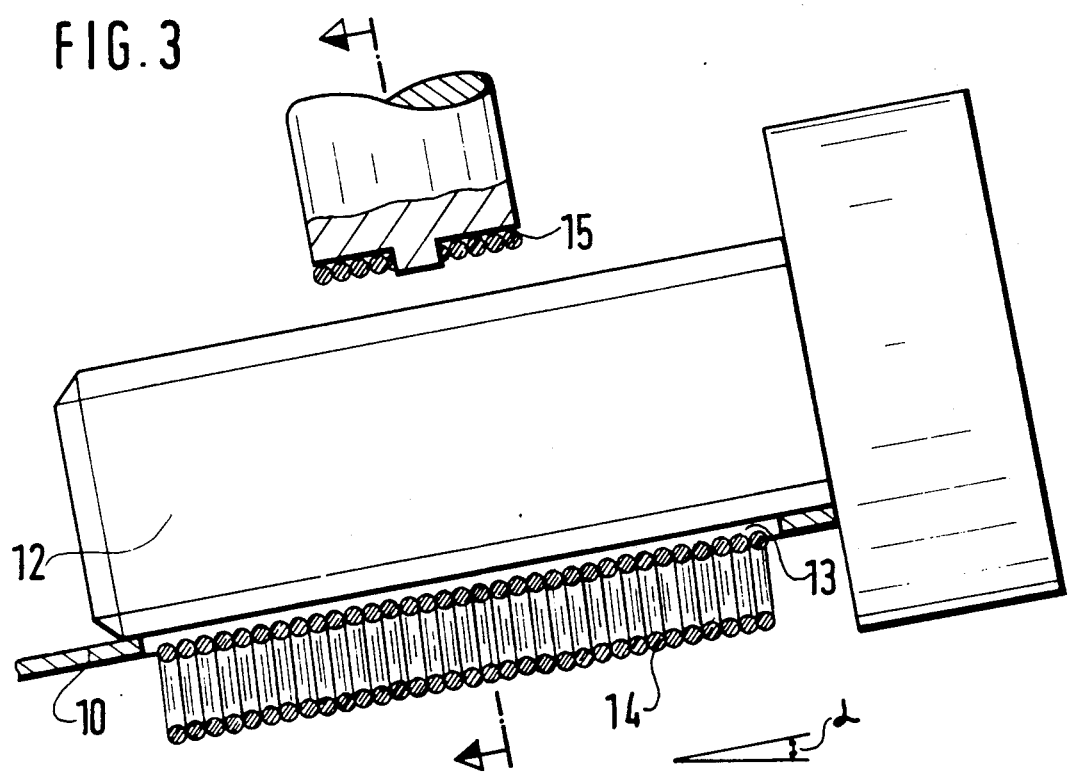

DEVICE FOR DETERMINING GEOMETRIC PARAMETERS OF A STRUCTURAL ELEMENT

RELATED APPLICATIONS

This application discloses subject matter which is similar to the subject matter of the co-pending application Ser. No. 463,154, filed on the same day as this application, by the applicants herein.

BACKGROUND OF THE INVENTION

The present invention relates to a measuring device for contactless control of a design of metallic structural elements, preferably helical structural elements, provided with at least one coil through which an alternating current flows.

Measuring devices of the above mentioned general type are known in the art. In known measuring devices the design of structural elements, for example screws, is determined by coils through which high frequency alternating current flows. The measuring principle is based on a change in the impedance of the coil when the shape of the structural element changes. The coils of the above mentioned devices are formed as flat coils. Such devices have some disadvantages. During measurements of relatively long screw thread when the whole thread length is desired to be controlled, the coils must have a rectangular or an oval shape. As a result, the construction of the coils is expensive and their manufacture is quite costly.

SUMMARY OF THE INVENTION

Accordingly, it is an object of the present invention to provide a measuring device of the above mentioned general type, which avoids the disadvantages of the prior art.

More particularly, it is an object of the present invention to provide a measuring device of the above mentioned general type, in which the geometry of a coil can be adjusted easier to different lengths of the structural elements.

In keeping with these objects and with others which will become apparent hereinafter, one feature of the present invention resides, briefly stated, in a measuring device for contactless control of a design of structural elements, which is provided with a coil for passing an alternating current therethrough so that its measuring voltage can be compared with a nominal value and thereby determine the design, wherein in accordance with the invention at least one of the coils is formed as a cylindrical coil.

When the measuring device is formed in accordance with the present invention with the cylindrical coil, the adjustment to the structural elements of different lengths is easier. The precision of the coil winding must satisfy only low requirements.

In accordance with another feature of the present invention, the device is provided with two such coils which are arranged opposite to one another. One of these coils can be formed as a cylindrical coil. It is also possible that both coils are formed as cylindrical coils.

Another advantageous feature of the present invention is that the two opposite coils are connected in series with one another in a bridge arrangement of an evaluating circuit of the measuring device.

Still a further feature of the present invention is that the coil has a length which substantially corresponds to a portion of a transporting element which supports a structural element, and thereby corresponds to the length of the structural element.

Since no high requirements are applied to the coil winding, conventionally available reactive (resistance) coils can be used in the inventive measuring device.

Finally, in accordance with another advantageous feature of the present invention, the cylindrical coil can have the shape of a circular cylinder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a section of a measuring device in accordance with the present invention, with an object to be measured and a portion of a transporting device;

FIG. 2 is a view substantially corresponding to the view of FIG. 1 but showing another embodiment of the inventive measuring device;

FIG. 3 is a view showing a section through the inventive measuring device shown in FIG. 2; and FIG. 4 is a view showing a bridge circuit for two coils of the inventive measuring device.

DESCRIPTION OF THE PREFERRED EMBODIMENTS

FIG. 1 shows a side wall 10 of a conveyor 11 for supplying screws 12 to be measured in sliding or rolling manner. The side wall serves as a guiding rail. The guiding rail 10 can be composed of any material. When it is composed of a metallic material, a window 13 is preferably provided.

A measuring device in accordance with the present invention has a coil 14 which is arranged in the region of the window 13 and controls the design of the screw 12. A coil 15 can be provided at the opposite side. The coils 14 and 15 produce measuring signals as will be described hereinbelow, and the measuring signals are compared in an evaluating circuit X with predetermined nominal values, so as to sort out the screws, depending on their quality.

In accordance with the present invention, the coils 14 and 15 are formed as cylindrical coils. Their axes of symmetry extend parallel to the axes of symmetry of the screws 12 to be measured. The cylindrical coils 14 and 15 can have various cross-sections. It is however preferable when the coils have a circular cross-section, so that they are formed as cirular cylinders.

The lengths of the cylindrical coils 14 and 15 substantially corresponds to the length of the region of the screw 12 to be monitored by the measuring device. In other words, it corresponds to a portion of the guiding rail 10 of conveyor 11 which guides the above mentioned region of the screw 12. It is to be understood that when the measuring device is used for controlling a thread on the screws, the above specified region corresponds to a threaded shaft of the screws.

In accordance with an especially advantageous feature of the present invention, the cylindrical coils can be formed as conventional commercially available resistance coils. They are produced in a price-favorable manner and are simpler to build-in than the flat coils. The resistance coils sense however only a partial region of a shaft periphery of the screw 12. In many cases this is sufficient to produce suitable measuring signals. As can be seen from FIG. 2, it is also possible to use a spiral coil for determing one parameter and a flat coil for determining another parameter in the inventive measuring device.

When the conveyor 11 is operated, the screws 1i are supplied one after the other in the direction of the arrow B to an area between both coils 14 and 15. A high frequency alternating current flows through the coils 14 and 15, and a magnetic alternating field is produced in the coils. This magnetic alternating field of the coils acts on the metallic surfaces of the threaded shafts of the screws 12 and generates eddy current in them. The larger is the surface of the shafts through which the magnetic field passes, the more eddy current is produced. It should be mentioned that the magnitude of the produced eddy current is dependent on the material of the screw, as well as on the distance from the coils 14 and 15 to the outer surface of the shaft.

The coil alternating current resistance changes under the action of the produced eddy current and leads to a change in the voltage applied to the coils 14 and 15. Since in the drawings the distance b from the screw 12 to the thread profile determining coil 14 remains always the same, the changes in the alternating current resistance can be attributed only to a deviation of the shape of the thread. When the screw 12 has for example a different pitch than that of a standard screw, or the thread is damaged at one or several locations, respective changes in the alternating current resistance occur. The measuring signal, which represents a change in voltage caused by a change in resistance of a respective coil resulting from the influence of eddy current generated in the screw 12 by flow of the alternating current through the respective coil, will then deviate from a predetermined nominal value. The comparison between the measuring signal and the nominal value is performed by an evaluating circuit which is identified as a whole with X. The circuit X comprises a comparator that compares the actual signal generated by the respective coil with a nominal value and generates an error signal when the actual measuring signal deviates from the nominal one by more than a predetermined amount. The circuit X is a conventional comparator circuit and does not form part of the present invention.

The diameter of the screw 12 can be determined with the help of another coil, for example, a flat coil 16 shown in FIGS. 2 and 3. Depending upon the distance a between the coil 15 of FIG. 1 or the coil 16 of FIGS. 2 and 3 and the screw 12, a predetermined measuring signal is determined. Due to the fixed distance to the wall 10, it is further possible to associate a corresponding size value with the respective measuring signal. When the distance a to the screw 12 increases this leads to a reduction of the eddy current produced in the surface of the screw 12 and thereby to a reduction of the resistance value of the coil 16. It is advantageous when the coil 14 is used for controlling the thread of the screws 12, while the coil 16 is used for controlling the diameter of the screws 12.

As can be seen from FIG. 4, the coils 14 and 16 can be connected in series with one another in a bridge arrangement of the evaluating device X. The single output of the bridge arrangement depends on signals generated by both coils so that, if a signal generated by any of the two coils deviates from a nominal value, the output signal of the bridge arrangement will deviate from a nominal value indicating that the structural element is defective. The output signal of the bridge arrangement is communicated to the evaluating circuit X as schematically shown by a line in FIG. 1.

The cylindrical coils can also be used in a measuring device operating in accordance with the principle of ferromagnetic effect. In such a device the ferromagnetic properties of the material of the screws influence the electromagnetic alternating field of the coils.

It will be understood that each of the elements described above, or two or more together, may also find a useful application in other types of constructions differing from the types described above.

While the invention has been illustrated and described as embodied in a measuring device for contactless control of a design of structural parts, especially helical structural parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for determining geometric parameters of a screw-shaped structural element, comprising a first cylindrical coil for determining a first geometric parameter, said first cylindrical coil having a length substantially corresponding to a length of the structural element; a second coil spaced from said first cylindrical coil and arranged opposite said first cylindrical coil for determining a second geometric parameter, said first and second coils being adapted to be located at different sides of a structural element and connectable to a source of an alternating voltage that provides for flow of an alternating current through said first and second coil, and each of said first and second coils generating a signal representative of a respective parameter of the structural element resulting from a change in an alternating current resistance in a respective coil caused by eddy current generated in the structural element by flow of the alternating current through the respective coil; and evaluating means for comparing the signal generated by each of said first and second coils with a nominal value for the respective parameter of the structural element to thereby provide an evaluation of the respective parameters.

2. A device as set forth in claim 1, further comprising transporting means extending between said first and second coils for conveying the structural element therebetween, said first coil being located beneath said transporting means.

3. A device as set forth in claim 1, wherein said first cylindrical coil is a resistance coil.

* * * * *